United States Patent
Sadikin et al.

(10) Patent No.: US 12,114,408 B2
(45) Date of Patent: Oct. 8, 2024

(54) CONTROLLER FOR PROVIDING UNINTERRUPTED CONTROL OF A NODE IN A LIGHTING NETWORK AND A METHOD THEREOF

(71) Applicant: SIGNIFY HOLDING B.V., Eindhoven (NL)

(72) Inventors: Mohammad Fal Sadikin, Eindhoven (NL); Muhammad Mohsin Siraj, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/913,903

(22) PCT Filed: Mar. 22, 2021

(86) PCT No.: PCT/EP2021/057193
§ 371 (c)(1),
(2) Date: Sep. 23, 2022

(87) PCT Pub. No.: WO2021/191110
PCT Pub. Date: Sep. 30, 2021

(65) Prior Publication Data
US 2024/0215134 A1    Jun. 27, 2024

(30) Foreign Application Priority Data

Mar. 24, 2020   (EP) ..................................... 20165247

(51) Int. Cl.
*H05B 47/17*       (2020.01)
*H04L 9/40*        (2022.01)

(52) U.S. Cl.
CPC ......... *H05B 47/17* (2020.01); *H04L 63/1416* (2013.01)

(58) Field of Classification Search
CPC ........................... H05B 47/17; H04L 63/1416
See application file for complete search history.

(56) References Cited

U.S. PATENT DOCUMENTS

| 8,346,726 B2 | 1/2013 | Liu et al. |
| 11,023,612 B2 * | 6/2021 | Koster ................... H04L 67/10 |

(Continued)

FOREIGN PATENT DOCUMENTS

| WO | 2019178158 A1 | 9/2019 |
| WO | 2020005567 A1 | 1/2020 |

OTHER PUBLICATIONS

Yang, Yu-Sheng et al., "An Implementation of High Efficient Smart Street Light Management System for Smart City," IEEE Access, Special Section on Data Mining for Internet of Things, Mar. 2020 (18 Pages).

(Continued)

*Primary Examiner* — Ryan Jager

(57) ABSTRACT

A method for providing uninterrupted control of a node via a segment controller; wherein the method comprises: executing a plurality of logical instances of a control application on the segment controller; detecting a malicious signal indicative of an unauthorized access request to the segment controller; determining that a logical instance which currently controls the node has been affected by the unauthorized access request; determining a logical instance, of the plurality of logical instances, which is unaffected by the unauthorized access request; switching the logical instance of the segment controller which controls the node from the affected logical instance to the unaffected logical instance.

14 Claims, 6 Drawing Sheets

(56) References Cited

U.S. PATENT DOCUMENTS

| | | | | |
|---|---|---|---|---|
| 11,271,801 | B2* | 3/2022 | Obaidi | H04L 41/0661 |
| 11,683,218 | B2* | 6/2023 | Obaidi | G06N 20/00 |
| | | | | 706/12 |
| 2016/0315955 | A1* | 10/2016 | Beatty | H04L 63/1425 |
| 2019/0079747 | A1 | 3/2019 | Sinha et al. | |
| 2019/0132145 | A1 | 5/2019 | Gerard | |
| 2019/0235973 | A1 | 8/2019 | Brewer et al. | |
| 2020/0007385 | A1* | 1/2020 | Obaidi | H04L 63/1425 |
| 2022/0060496 | A1* | 2/2022 | Siraj | H04L 12/2818 |
| 2022/0271991 | A1* | 8/2022 | Obaidi | H04L 63/1425 |
| 2023/0269021 | A1* | 8/2023 | Sadikin | H04K 3/825 |
| | | | | 455/1 |

OTHER PUBLICATIONS

Kanizo, Yossi, et al., "Optimizing Virtual Backup Allocation for Middleboxes," IEEE/ACM Transactions on Networking, vol. 25, No. 5, Oct. 2017 (14 Pages).

* cited by examiner

CONTROLLER FOR PROVIDING UNINTERRUPTED CONTROL OF A NODE IN A LIGHTING NETWORK AND A METHOD THEREOF

CROSS-REFERENCE TO PRIOR APPLICATIONS

This application is the U.S. National Phase application under 35 U.S.C. § 371 of International Application No. PCT/EP2021/057193, filed on Mar. 22, 2021, which claims the benefit of European Patent Application No. 20165247.6, filed on Mar. 24, 2020. These applications are hereby incorporated by reference herein.

FIELD OF THE INVENTION

The invention relates to a method for providing uninterrupted control of a node. The invention further relates to a segment controller, a system and a computer program product for providing uninterrupted control of a node.

BACKGROUND

Systems being formed from smart devices and home networks typically fall under the heading of smart home systems. Smart home systems are often connected to the Internet, typically such that they may be controlled by a user when (s)he is out-of-home. Although referred to above as a 'home' system, such a system can be implemented in any environment such as a workspace or outdoor space, such that the system comprises, and may be used to control, devices placed within the environment. The connected devices are any devices capable of being connected to, or identified by, the system. A commonly used phrase for such a system and its devices is the Internet of Things (IOT) and IoT devices. In the Internet of Things (IOT) many kinds of devices are connected to the Internet, allowing elements of an environment such as heating and lighting to be controlled using dedicated devices which are networked together into the 'home' system.

The nature of IoT systems where each device is connected to each other and/or to the Internet introduces serious risk for a cyber-attack. Various types of cyber-attacks which are generally known in the Internet systems are now also applicable to the IoT domain. In addition, the massive deployment of IoT devices and its new applications can also open new cyber-attack vectors that have never seen before.

SUMMARY OF THE INVENTION

The inventors have realized that providing additional device as a back-up, in case of cyber-attack, for each device is expensive and complex to manage, particularly in a large-scale IoT system. The inventors have further realized, when one or more devices are under cyber-attack, it becomes difficult to first minimize the impact of the cyber-attack and secondly to recover the victim devices.

It is therefore an object of the present invention to provide uninterrupted control of a device in case of a cyber-attack. The further object of the present invention is to minimize the impact of the cyber-attack and recover the victim device(s) without losing the control of the device(s).

According to a first aspect, the object is achieved by a method for providing uninterrupted control of a node via a segment controller; wherein the method comprises: executing a plurality of logical instances of a control application on the segment controller; detecting a malicious signal indicative of an unauthorized access request to the segment controller; determining that a logical instance which currently controls the node has been affected by the unauthorized access request; determining a logical instance, of the plurality of logical instances, which is unaffected by the unauthorized access request; switching the logical instance of the segment controller which controls the node from the affected logical instance to the unaffected logical instance.

A communication network may comprise a plurality of nodes, wherein the plurality of nodes may be divided into segments. Each segment may comprise at least one node which may be controlled via a segment controller. The method for providing uninterrupted control of a node, which may belong to a segment, via the segment controller may comprise executing a plurality of logical instances of a control application on the segment controller. A logical instance may be a virtual instance of a device, such as a segment controller, in a layer abstracted from the actual hardware. A plurality of logical instances may be executed, for example, by running the plurality of logical instances in parallel.

The method may further comprise detecting a malicious signal indicative of an unauthorized access request to the segment controller. The malicious signal may be detected by the segment controller or any other device or system external to the segment controller. The malicious signal may be detected, for example, based on a network traffic analysis. The unauthorized access request may comprise any known cyber-attack in the art, e.g. denial-of-service (DOS), Man-in-the-middle (MitM), injection of malware, botnet activities, spoofing, etc. The method may further comprise determining that a logical instance which currently controls the node has been affected by the unauthorized access request and determining a logical instance, of the plurality of logical instances, which is unaffected by the unauthorized access request. The plurality of logical instances may be scanned for determining which one is unaffected. A challenge-response method may be used to determine which one of the plurality of logical instance is affected or unaffected.

The method may further comprise switching the logical instance of the segment controller which controls the node from the affected logical instance to the unaffected logical instance. Since, the determined affected logical instance is switched to determined unaffected logical instance to control the node, the method minimizes the impact of the cyber-attack and recovers the victim node, thus providing an uninterrupted control of the node.

In an embodiment, the segment controller may be arranged for receiving control commands from a central controller for controlling the node, and wherein the central controller may be connectable to the segment controller via a local network and/or an external network; wherein the method may further comprise: determining whether the unauthorized access request is received via the local network or the external network; and wherein when the unauthorized access request is received via the local network; disconnecting a local connection of the central controller with the segment controller; receiving the control commands from the central controller via the external network; and wherein when the unauthorized access request is received via the external network; disconnecting an external connection of the central controller with the segment controller; receiving the control commands from the central controller via the local network.

The segment controller may be arranged for receiving the control commands for controlling the node from a central controller. The central controller may be a user device, for example a smartphone, a laptop computer, a tablet computer, a personal digital assistant (PDA) or some other mobile computing device, which may control the node via the segment controller. The central controller may be connected to the segment controller via a local network. The local network, such as a wired or wireless LAN, may comprise the central controller, segment controller and at least one segment comprising the node. The central controller may be connected to the segment controller via an external network, wherein in the external network the control commands from the central controller may be routed via a remote server (e.g. from the cloud) to the segment controller. When it is determined that the unauthorized access request may be received via the local network, the control commands from the central controller may be received via the external network and vice versa to provide uninterrupted control. Since, the reception of unauthorized access request via the local/external network discloses the vulnerability of the local/external network connection to cyber-attacks, such a local or external connection is disconnected accordingly to avoid further (potential) cyber-attack(s).

In an embodiment, the method may further comprise: determining whether the central controller is connected to the segment controller via the local network and/or the external network; wherein when the unauthorized access request is received via the local network and when the central controller is not connected to the segment controller via the external network; establishing, prior to receiving the control commands from the central controller via the external network; an external connection between the central controller and the segment controller; and wherein when the unauthorized access request is received via the external network and when the central controller is not connected to the segment controller via the local network; establishing, prior to receiving the control commands from the central controller via the local network; a local connection between the central controller and the segment controller.

In this embodiment, a local or an external connection between the central controller and the segment controllers are advantageously established prior to receiving the control commands from the central controller via the local or external, network based on the determination of when the unauthorized access request is received via the local or the external network and when the central controller is not connected to the segment controller via the local or the external network.

In an embodiment, the switching may further comprise suspending the affected logical instance.

The switching of the affected logical instance to the unaffected logical instance may further comprise suspending the affected logical instance. This is advantageously performed to minimize the impact of the cyber-attack.

In an embodiment, the plurality of logical instances may be executed at the startup of the segment controller, and subsequently only one logical instance, of the plurality of logical instances, may be active at a time; wherein remaining logical instances, of the plurality of logical instances, may be idle.

The plurality of logical instances may be executed when the segment controller has booted, e.g. after a power off. After the startup of the segment controller, only one logical instance is 'active'. The active logical instance is the one controlling the node. The remaining logical instance(s) of the plurality of logical instances may be 'idle', e.g. not active. The remaining logical instance may be running simultaneously (in parallel) in the background. In this example, only one logical instance may be active at a time. Alternatively, more than one logical instance is active at a time.

In an embodiment, the plurality of logical instances of the control application may be executed on the segment controller using virtualization techniques. In an embodiment, the virtualization techniques may comprise one or more of type-1 virtualizations, type-2 virtualizations, container-based virtualizations, application virtualizations, physical or hardware virtualizations.

Virtualization may comprise creating a virtual (rather than actual) version of something, including but not limited to computer/network hardware such as a segment controller, central controller, node etc., storage devices, and computer network resources. Virtualization is well-known technology where the computing resources are physically or logically allocated for each program in multiple instances, e.g. via installation of multiple operating systems. Various virtualization techniques, e.g. type-1 virtualizations, type-2 virtualizations, container-based virtualizations, application virtualizations, physical virtualizations may be advantageously used. Other virtualization techniques known in the art is not excluded.

In an embodiment, the node may be comprised in a lighting network; and wherein when the malicious signal is detected; the lighting network may be switched from a normal control mode to a basic lighting control mode; wherein in the basic lighting control mode, the determination of an unaffected logical instance, of the plurality of logical instances, may be limited to an unaffected logical instances arranged for providing control of the node being a lighting device.

In a (connected) lighting network, which refers to a network of one or more lighting devices, sensing devices, functional devices such as an actuation element, an audio/video device etc. which are controlled not by (or not only by) a traditional wired, electrical on-off or dimmer circuit, but rather by using a data communications protocol via a wired or more often wireless connection, e.g. a wired or wireless network. In such a connected lighting network/system, a normal control mode may comprise control of more than just lighting devices, and wherein when the malicious signal is detected, the lighting network, e.g. is switched from the normal control mode to a basis lighting control mode, wherein in the basic control mode, the determination of an unaffected logical instance, of the plurality of logical instances, may be limited to an unaffected logical instances arranged for providing control of the lighting device. In an example, the basic lighting mode may comprise controlling the lighting device to provide a functional lighting such as basic lighting functionalities, e.g. ON, OFF, dim down/up.

In an embodiment, the malicious signal may be detected by the segment controller using detection mechanism algorithms. In an embodiment, the unauthorized access request may be detected by an external device, external to the segment controller.

The segment controller may (locally) detect the malicious signal. For instance, the segment controller may analyze several aspects including analyzing network traffic, process and instruction in an operating system, and based on such analysis can detect the malicious signal. Additionally, or alternatively, the segment controller may randomly or periodically send the log analysis in secure channel to a (trusted) external device/system so that the detection of the malicious signal may be performed by the external device or system, external to the segment controller, e.g. via a server in the cloud. In an example, the detection may be partially performed in the segment controller and the external device, e.g. cloud.

In an embodiment, the detection mechanism algorithms may comprise one or more of: intrusion detection systems, machine learning techniques, rule-based learning, anomaly detection, learning systems.

Different detection mechanism algorithms may be advantageously used to detect the malicious signal. For example, intrusion detection systems, machine learning techniques, rule-based learning, anomaly detection, signature-based, learning systems may be used. Other algorithms known in the art may also be used. The selection of the detection mechanism algorithm may be advantageously selected based on the resources available to perform such detection mechanism algorithm, e.g. based on which device performs the detection.

According to a second aspect, the object is achieved by a segment controller for providing uninterrupted control of a node; wherein the segment controller comprises: a local input interface to receive control commands from a central controller via a local network; an external input interface to receive the control commands from the central controller via an external network; an output interface to output control instructions based on the received control commands to the node; and a processor to execute the steps of the method according to the first aspect.

According to a third aspect, the object is achieved by a system for providing uninterrupted control of a node; wherein the system comprises: a segment controller according to the second aspect; and the node.

In an embodiment, the system may further comprise the central controller; wherein the segment controller is arranged for receiving the control commands from the central controller.

According to a fourth aspect, the object is achieved by a computer program product comprising instructions which, when the program is executed by a computer, cause the computer to carry out the steps of the method according to the first aspect.

It should be understood that the computer program product, the system and the controller may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of systems, devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
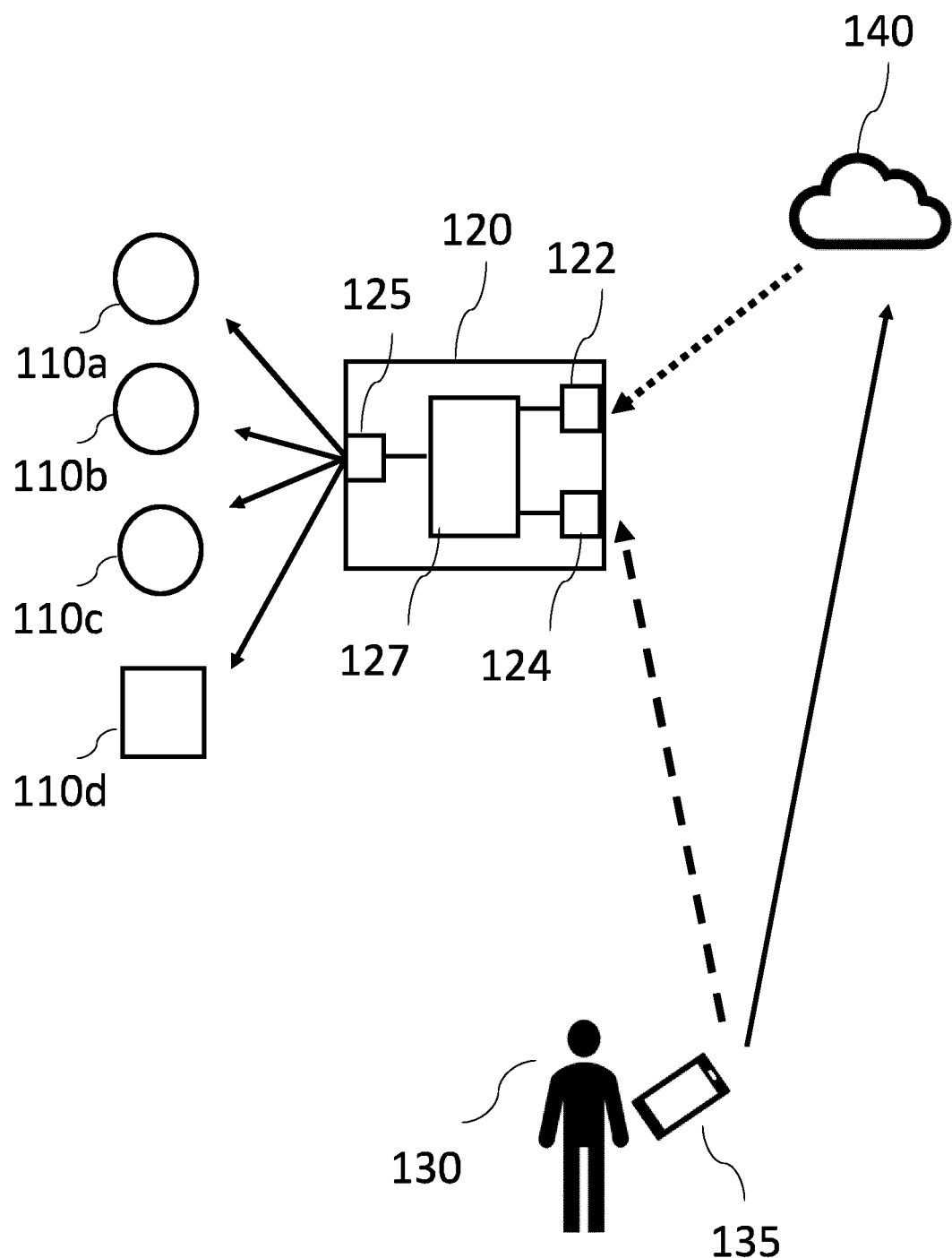
FIG. 1 shows schematically and exemplary an embodiment of a system for providing uninterrupted control of a node.

FIG. 1 shows schematically and exemplary an embodiment of a system 100 for providing uninterrupted control of a node 110a-d. The system 100 may comprise any communication network, e.g. IoT systems, comprising a plurality of nodes 110a-d. The nodes 110a-d may be one or more of: a lighting device, a sensing device, gateways, or any functional device. The functional device for example be a heating device, an actuation device, a media rendering device etc. The system 100 may be a (connected) lighting system, such as Philips Hue. In the exemplary figure, the nodes 100a-d may comprise lighting devices 110a-c and a sensing device 110d. The nodes 110a-d may be divided into one or more segments. For the sake of clarity of representation, only one segment is shown here. The system 100 may comprise any number of segments. The segments may be formed based on to location of the nodes 110a-d relative to each other or relative to a segment controller 120; or may be formed based on operation, time etc.

The segment may be controlled via a segment controller 120, e.g. the nodes 110a-d comprised in the segment is controlled via the segment controller 120. A node 110a-d may be controlled via the segment controller 120 of its own segment or a segment controller of a neighboring segment or via any other segment controller in the network. As an example of node being controlled via the segment controller, when the node 110a-d is a lighting device, the operational state of the lighting device may be controlled via the segment control 120. The segment controller 120 may comprise a local input interface 124, an external input interface 122, an output interface 125 and a processor 127. The segment controller 120 may further comprise memory (not shown). The local input interface 124 may be arranged to receive control commands from a central controller 135 via a local network and the external input interface 122 to receive the control commands from the central controller 135 via an external network. The output interface 125 may be arranged to output control instructions based on the received control commands to the nodes 110a-d. In the exemplary figure, a star network topology is shown, wherein the segment controller 120 has a direct wireless communication path to every node 110a-d in the network. The network may have a mesh network topology, wherein the plurality of nodes 110a-d does in general not communicate directly with the segment controller, but via so-called multi-hop communications. The segment controller 120 may have wired connection with the nodes 110a-d.

The segment controller 120 may be implemented in a unit separate from the nodes 110a-d, such as wall panel, desktop computer terminal, or even a portable terminal such as a laptop, tablet or smartphone. Alternatively the segment controller 120 may be incorporated into the same unit as the node 110-ad. Further, the segment controller 120 may be implemented in a single unit or in the form of distributed functionality distributed amongst multiple separate units (e.g. a distributed control function distributed amongst the nodes 110a-d). Furthermore, the segment controller 120 may be implemented in the form of software stored on a memory (comprising one or more memory devices) and arranged for execution on a processor (comprising one or more processing units), or the segment controller 120 may be implemented in the form of dedicated hardware circuitry, or configurable or reconfigurable circuitry such as a PGA or FPGA, or any combination of these.

The communication between the segment controller 120 and the nodes 110a-d may be bidirectional, such that the segment controller 120 may receive communication signals from the node 110a-d, e.g. sensor signal from a sensing device. As an example, the segment controller 120, additionally, and/or alternative to receiving control commands from the central controller 135, may control the node 110a-d, e.g. based on the sensor signal.

Regarding the various communication involved in enabling the segment controller 120 to communicate with the node 110a-d, these may be implemented in by any suitable wired and/or wireless means, e.g. by means of a wired network such as an Ethernet network, a DMX network or the Internet; or a wireless network such as a local (short range) RF network, e.g. a Wi-Fi, ZigBee or Bluetooth network; or any combination of these and/or other means.

The central controller 135 may be a user device 135, for example a smartphone, a laptop computer, a tablet computer, a personal digital assistant (PDA) or some other mobile computing device, which may control the node 110a-d via the segment controller 120. In this exemplary figure, the central controller 135 is a smartphone of a user 130. The central controller 135 may be connected to the segment controller 120 via a local network, such as a wired or wireless LAN. The central controller 135 may be connected to the segment controller 120 via an external network, wherein in the external network the control commands from the central controller 135 may be routed via a remote server, e.g. cloud 140, to the segment controller 120. The wireless communication between the central controller 135 and the segment controller 120 via the external network, including in particular a remote server, may be a cellular wireless technology, such as a GSM (Group Special Mobile or 2G (second generation) network), a 3G network, or a 4G or LTE (Long Term Evolution) network, etc.

Figure 2:
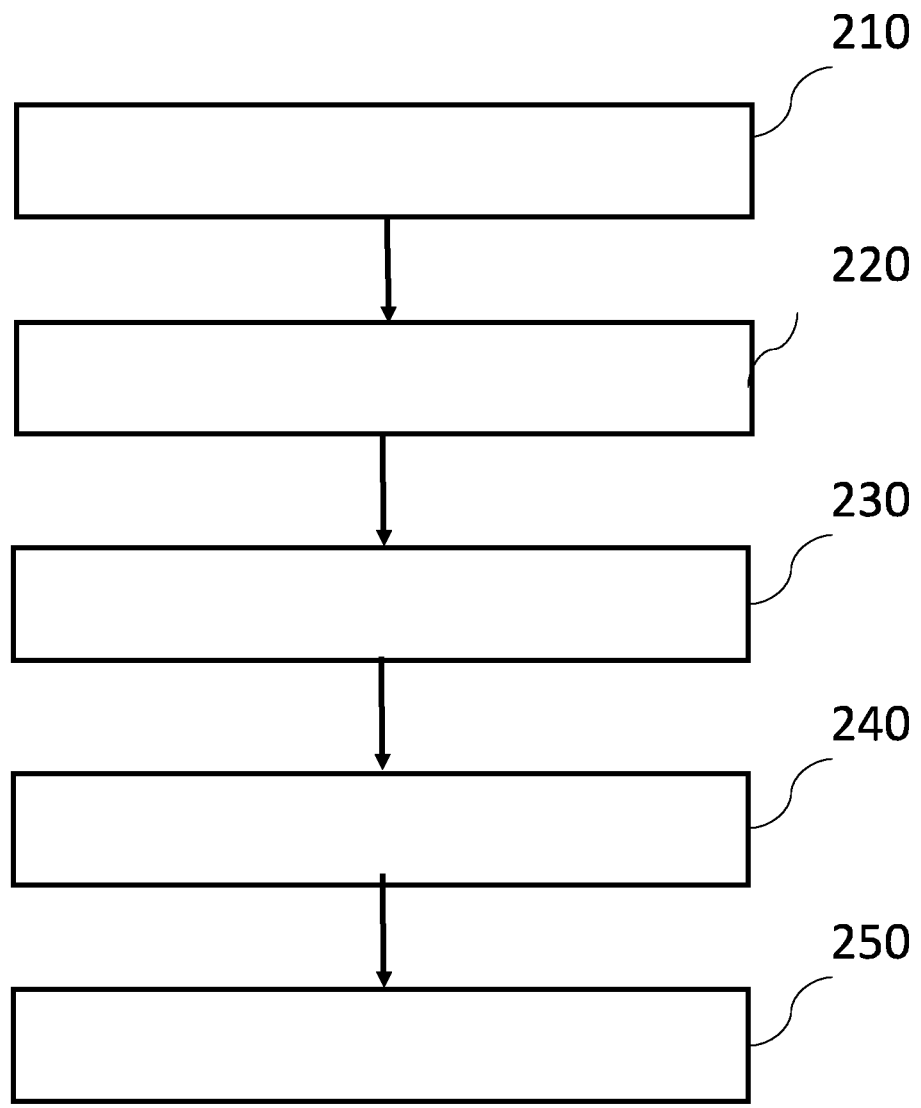
FIG. 2 shows schematically and exemplary a flowchart illustrating an embodiment of a method for providing uninterrupted control of a node.

FIG. 2 shows schematically and exemplary a flowchart illustrating an embodiment of a method 200 for providing uninterrupted control of a node 110a-d. The method 200 may comprise executing 210 a plurality of logical instances of a control application on the segment controller 120. The logical instance may be a virtual instance of a control application. The control application may relate to control of the node 110a-d. The plurality of logical instances may be executed 210 at the startup of the segment controller 120, and subsequently only one logical instance, of the plurality of logical instances, may be active at a time; wherein remaining logical instances, of the plurality of logical instances, may be idle. The idle remaining logical instance may be running in background but not active in controlling the node 110a-d.

In an example, the plurality of logical instances of the control application may be executed 210 on the segment controller 120 using virtualization techniques. Virtualization is the process of running a virtual (logical) instance of a device, such as a segment controller 120, in a layer abstracted from the actual hardware. The virtualization techniques may comprise one or more of type-1 virtualizations, type-2 virtualizations, container-based virtualizations, application virtualizations, physical virtualizations.

Figure 4:
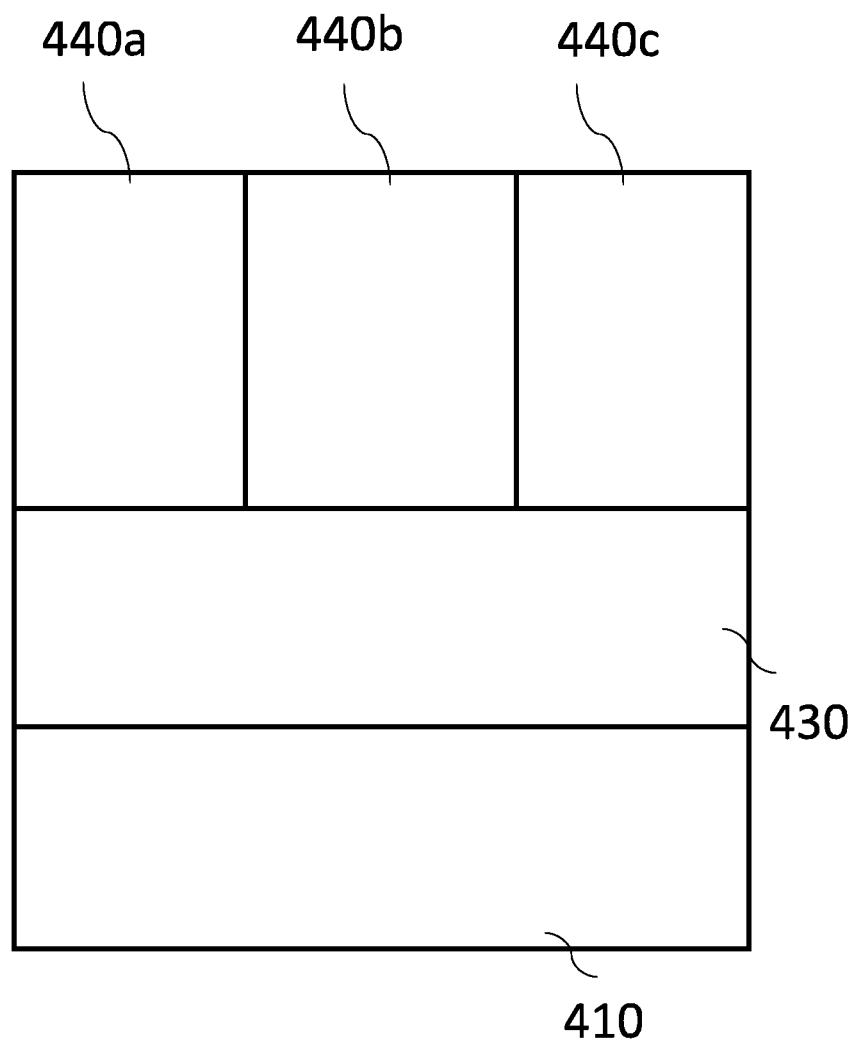
FIG. 4 shows schematically and exemplary a type-1 hypervisor virtualization technique.

Now referring to FIG. 4 which shows schematically and exemplary a type-1 hypervisor virtualization technique. A host machine 410 such as the segment controller 120 is a device/machine on which a plurality of logical instances or virtual machines 440a-c can be created and executed. A software/firmware or hardware 430 which runs on the host machine is a Hypervisor 430 which is arranged for creating, managing and running the plurality of logical instances or virtual machines 440a-c. In type-1 virtualization, these hypervisors 430 run directly on the host's hardware 410 to control the hardware and to manage the plurality of logical instances or virtual machines 440a-c. For this reason, they are sometimes called bare metal hypervisors. The plurality of logical instances or virtual machines 440a-c may, for example, comprise different operating systems, arranged for performing different tasks. For example, the hypervisor 430 installed in the host machine 410 (the segment controller 120) may create the plurality of logical instances or virtual machines 440a-c to control different nodes 110a-d, such as a main logical instance arranged for controlling all nodes 110a-d, a logical instance or virtual machine 440a-c arranged to control lighting control, a logical instance or virtual machine 440a-c arranged for controlling a sensing device etc. Therefore, the task of controlling the plurality of nodes 110a-d may be divided in the plurality of logical instances or virtual machines 440a-c.

Figure 5:
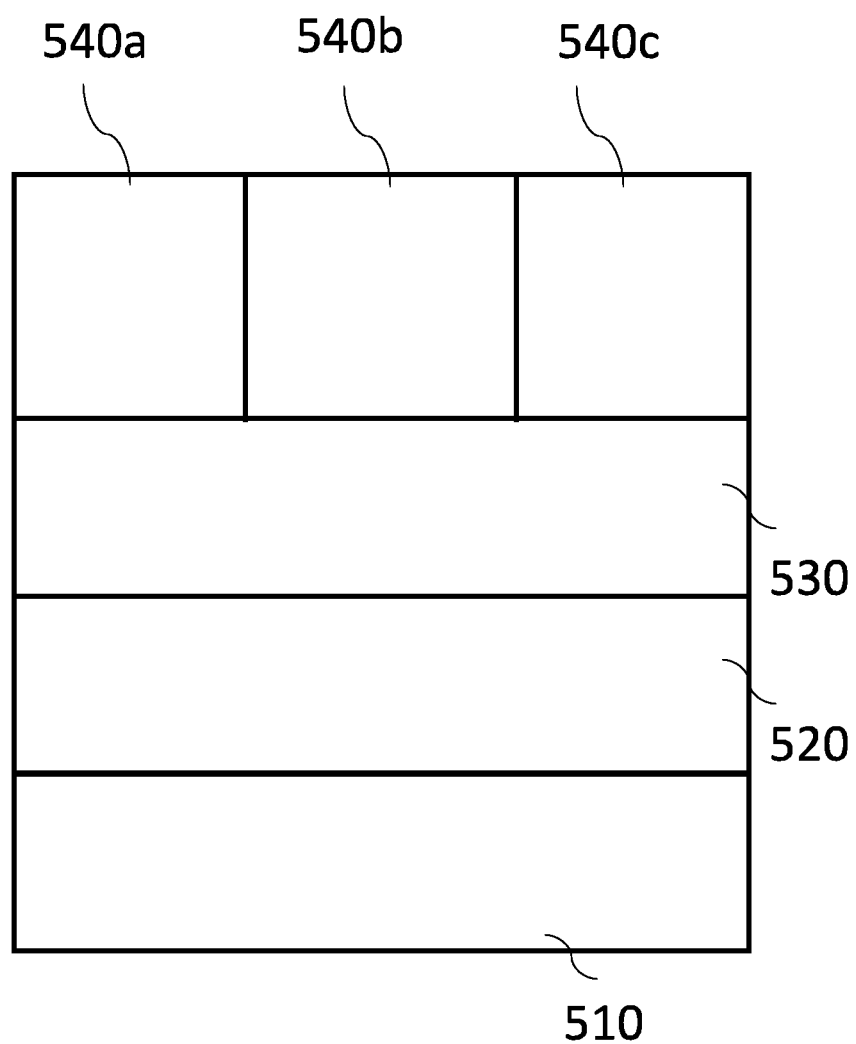
FIG. 5 shows schematically and exemplary a type-2 hypervisor virtualization technique.

FIG. 5 shows schematically and exemplary a type-2 hypervisor virtualization technique. The Type-2 or hosted hypervisors 530 runs on top of a conventional operating system (OS) 520 just as other computer programs do. For example, for an IoT device such as the segment controller, the conventional operating system may be Linux based OpenWrt. Type-2 hypervisors 530 abstract plurality of logical instances or virtual machines 440a-c from the host operating system 520. The host operating system such as OpenWrt runs on the host machine 510 (such as the segment controller 120).

Figure 6:
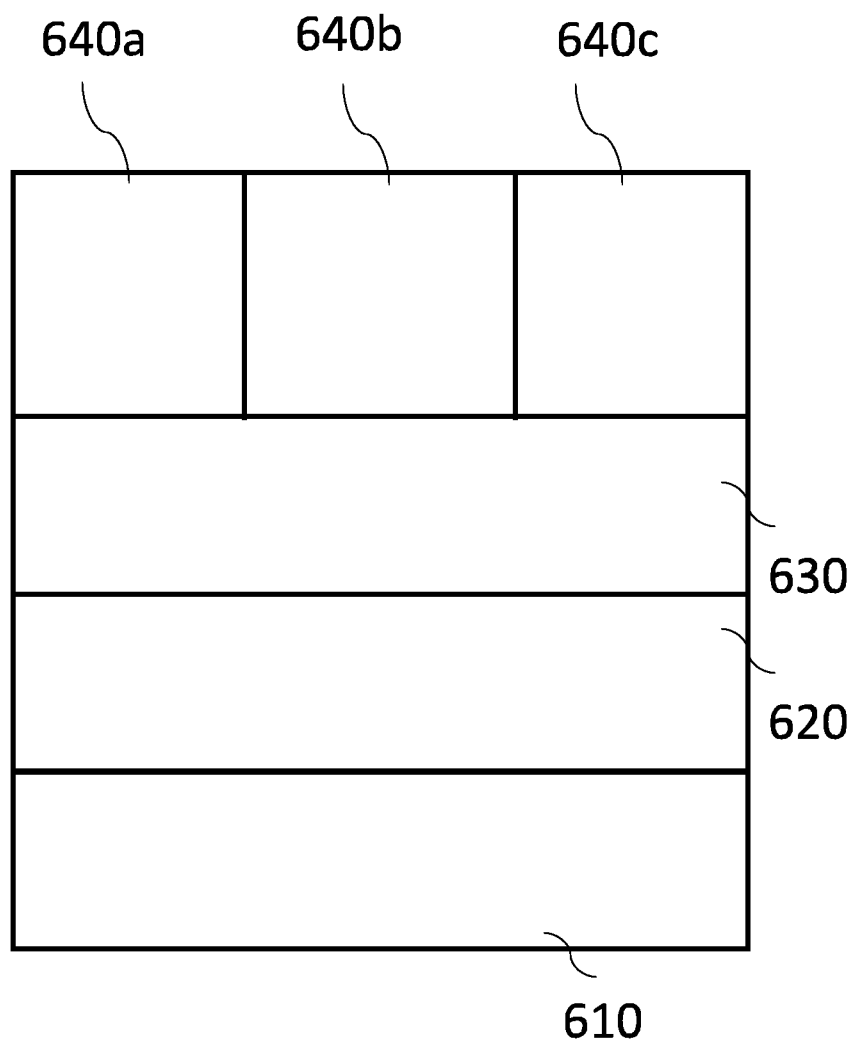
FIG. 6 shows schematically and exemplary a container-based virtualization technique.

FIG. 6 shows schematically and exemplary a container-based virtualization technique. Operating-system-level virtualization, also known as containerization or container-based virtualization, refers to an operating system feature in which the kernel allows the existence of multiple isolated user-space instances. Such instances are called containers. A computer program running on an ordinary operating system can see all resources. For example, for the ordinary conventional operating system running on the segment controller, e.g. can see connecting devices such as the plurality of nodes 1101-d, computational power of the segment controller 120 and/or other quantifiable hardware capabilities of the segment controller 120 such as memory. However, programs running inside a container can only see the container's contents and devices assigned to the container. For example, for one of the containers which is arranged for controlling the lighting devices, the programs running in that container can only see the connected lighting devices and other related resources.

Now coming back to FIG. 2, the method 200 may further comprise detecting 220 a malicious signal indicative of an unauthorized access request to the segment controller 120. The malicious signal may be detected by the segment controller 120 using detection mechanism algorithms. Additionally, and/or alternatively, the malicious signal may be detected by an external device, external to the segment controller 120. In an example, the user device 135 may detect the malicious signal, for instance, if the segment controller 120 does not respond to control commands received from the user device 135, the user device 135 may infer the presence of the malicious signal. The detection mechanism algorithms may comprise one or more of intrusion detection systems, machine learning techniques, rule-based learning, anomaly detection, learning systems. For example, the detection mechanism algorithm may comprise rule-based learning, wherein the rules may be defined, e.g. on signal strength, network traffic etc. and based on these predefined rules, the malicious signal may be detected. Machine learning may be used alternative or in addition with rule-based learning to detect the malicious signal.

The method 200 may further comprise determining 230 that a logical instance which currently controls the node has been affected by the unauthorized access request. The determination 230 may be performed by the segment controller 120 and/or by any device external to the segment controller, e.g. the central controller 135.

The method 200 may further comprise determining 240 a logical instance, of the plurality of logical instances, which is unaffected by the unauthorized access request. A logical instance which is unaffected by the unauthorized access request is determined. In an example, the node 110a-d is comprised in a lighting network; and wherein when the malicious signal is detected; the lighting network is switched from a normal control mode to a basic lighting control mode; wherein in the basic lighting control mode, the determination of an unaffected logical instance, of the plurality of logical instances, may be limited to an unaffected logical instances arranged for providing control of the lighting device. The lighting network may comprise a plurality of nodes 110a-d such as lighting device, sensing device, gateways etc. The basic lighting control mode may comprises controlling the node 110a-d being the lighting device, wherein in the basic lighting control mode, the determination of an unaffected logical instance may be limited to an unaffected logical instances arranged for providing control of the lighting device. In an example, the basic control lighting mode the control of the lighting device may be limited to providing functional lighting. The functional lighting provides the mandatory illumination needed for the daily activities in our lives. Alternatively, the basic lighting control mode may comprise providing complete functionality of the lighting device. The other nodes 110a-d such as sensors, gateways may be uncontrolled in the basic lighting control mode.

The method 200 may further comprise switching 250 the logical instance of the segment controller 120 which controls the node from the affected logical instance to the unaffected logical instance. In an example, the switching 250 may further comprise suspending the affected logical instance to minimize the impact of cyber-attack.

Figure 3:
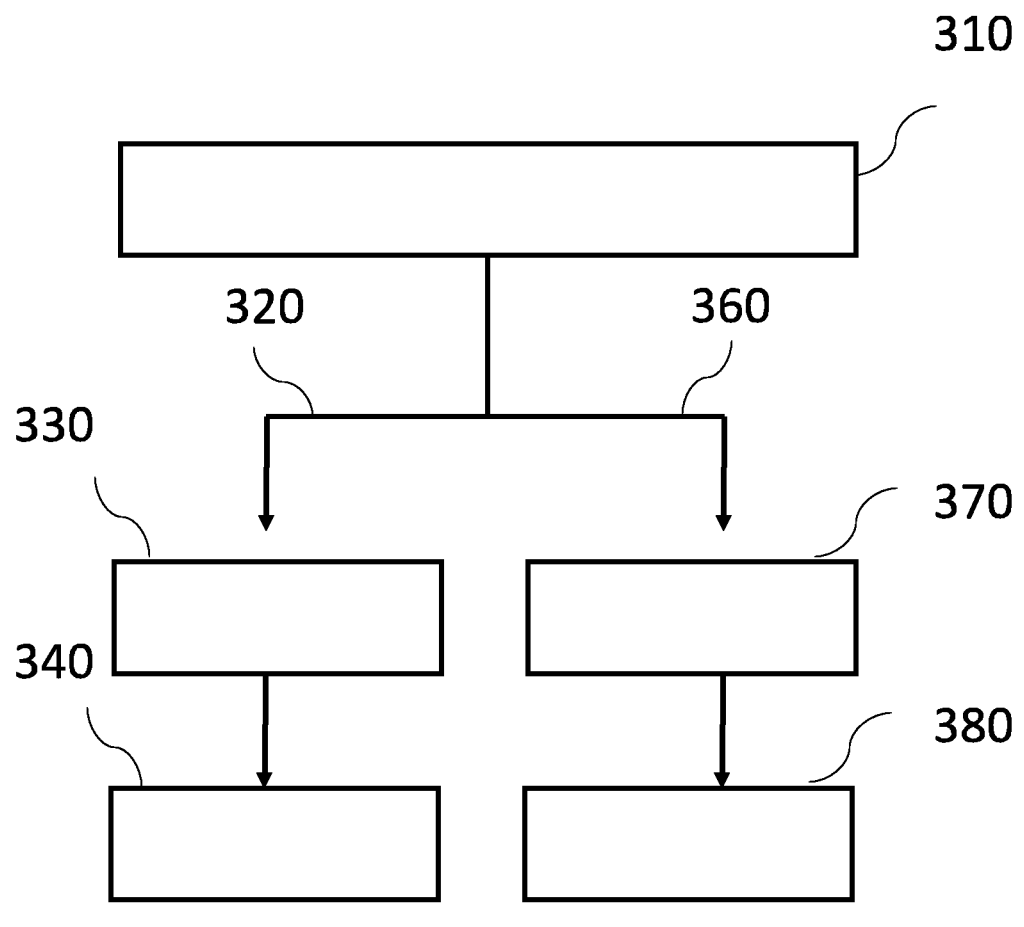
FIG. 3 shows schematically and exemplary a flowchart illustrating another embodiment of a method for providing uninterrupted control of a node.

FIG. 3 shows schematically and exemplary a flowchart illustrating another embodiment of a method 300 for providing uninterrupted control of a node. The method 300 may comprise determining 310 whether the unauthorized access request is received via the local network or the external network. In an example, the segment controller 120 may determine 310 whether it has received the unauthorized access request via the local network or the external network. Based on the determination 310, such that when the unauthorized access request is received 320 via the local network; the method 300 may further comprise disconnecting 330 a local connection of the central controller 135 with the segment controller 120. The disconnection 330 may be performed to avoid further potential cyber-attack via the local network. The method 330 may further comprise receiving 340 the control commands from the central controller 135 via the external network. In an example, when the unauthorized access request is received via the local network and when the central controller is not connected to the segment controller via the external network; the method may also comprise (not shown) establishing, prior to receiving the control commands from the central controller 135 via the external network; an external connection between the central controller 135 and the segment controller 120.

Based on the determination 310, such that when the unauthorized access request is received 360 via the external network; the method 300 may further comprise disconnecting 370 an external connection of the central controller 135 with the segment controller 120. The method 300 may further comprise receiving 380 the control commands from the central controller 135 via the local network. In an example, when the unauthorized access request is received via the external network and when the central controller is not connected to the segment controller 120 via the local network; the method 300 may further comprise (not shown) establishing, prior to receiving the control commands from the central controller via the local network; a local connection between the central controller 135 and the segment controller 120.

The method 200-300 may be executed by computer program code of a computer program product when the computer program product is run on a processing unit of a computing device, such as the processor 127 of the segment controller 120 or on the central controller 135.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method for providing uninterrupted control of a node via a segment controller; wherein the node is comprised in a lighting network:
wherein the method comprises:
executing a plurality of logical instances of a control application on the segment controller;
detecting a malicious signal indicative of an unauthorized access request to the segment controller;
determining that a logical instance which currently controls the node has been affected by the unauthorized access request;
determining a logical instance, of the plurality of logical instances, which is unaffected by the unauthorized access request;
switching the logical instance of the segment controller which controls the node from the affected logical instance to the unaffected logical instance;
and wherein when the malicious signal is detected; the lighting network is switched from a normal control mode to a basic lighting control mode; wherein in the basic lighting control mode, the determination of an unaffected logical instance, of the plurality of logical instances, is limited to an unaffected logical instances arranged for providing control of the node being a lighting device;
wherein in the basic control lighting mode, the control of the lighting device is limited to providing functional lighting, which provides the mandatory illumination needed for the daily activities.

2. The method according to the claim 1; wherein the segment controller is arranged for receiving control commands from a central controller for controlling the node, and wherein the central controller is connectable to the segment controller via a local network and/or an external network;
wherein the method further comprises:
determining whether the unauthorized access request is received via the local network or the external network;
and wherein when the unauthorized access request is received via the local network;
disconnecting a local connection of the central controller with the segment controller;
receiving the control commands from the central controller via the external network;
and wherein when the unauthorized access request is received via the external network;
disconnecting an external connection of the central controller with the segment controller;
receiving the control commands from the central controller via the local network.

3. The method according to the claim 2; wherein the method further comprises:
determining whether the central controller is connected to the segment controller via the local network and/or the external network;
wherein when the unauthorized access request is received via the local network and when the central controller is not connected to the segment controller via the external network;
establishing, after the unauthorized access request, an external connection between the central controller and the segment controller; and
wherein when the unauthorized access request is received via the external network and when the central controller is not connected to the segment controller via the local network;
establishing, after the unauthorized access request, a local connection between the central controller and the segment controller.

4. The method according to the claim 1; wherein the switching further comprises suspending the affected logical instance.

5. The method according to the claim 1; wherein the plurality of logical instances are executed at the startup of the segment controller, and subsequently only one logical instance, of the plurality of logical instances, is active at a time; wherein remaining logical instances, of the plurality of logical instances, are idle.

6. The method according to the claim 1; wherein the plurality of logical instances of the control application is executed on the segment controller using virtualization techniques.

7. The method according to the claim 6; wherein the virtualization techniques comprise one or more of type-1 virtualizations, type-2 virtualizations, container-based virtualizations, application virtualizations, physical or hardware virtualizations.

8. The method according to the claim 1; wherein the malicious signal is detected by the segment controller using detection mechanism algorithms.

9. The method according to the claim 1; wherein the malicious signal is detected by an external device, external to the segment controller.

10. The method according to the claim 8; wherein the detection mechanism algorithms comprise one or more of intrusion detection systems, machine learning techniques, rule-based learning, anomaly detection, learning systems.

11. A segment controller for providing uninterrupted control of a node; wherein the segment controller comprises:
a local input interface to receive control commands from a central controller via a local network;
an external input interface to receive the control commands from the central controller via an external network;
an output interface to output control instructions based on the received control commands to the node; and
a processor to execute the steps of the method according to claim 1.

12. A system for providing uninterrupted control of a node;
wherein the system comprises:
a segment controller according to the claim 11; and
the node.

13. The system according to claim 12; wherein the system further comprises the central controller; wherein the segment controller is arranged for receiving control commands from the central controller.

14. A computer program product comprising instructions which, when the program is executed by a segment controller or a central controller, cause the segment controller or the central controller to carry out the steps of the method of claim 1.

* * * * *